(12) United States Patent
Neubauer et al.

(10) Patent No.: US 6,200,509 B1
(45) Date of Patent: Mar. 13, 2001

(54) FORM OF SYNTHETIC RUBBER

(75) Inventors: Anthony Charles Neubauer, Piscataway; Leonard Sebastian Scarola, Union; Benjamin Roman Rozenblat, Old Bridge, all of NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/105,764

(22) Filed: Jun. 26, 1998

(51) Int. Cl.$^7$ .................................................. B29C 47/00
(52) U.S. Cl. ............................................. 264/118; 264/141
(58) Field of Search .................................... 264/118, 141, 264/142, 143

(56) References Cited

U.S. PATENT DOCUMENTS

| | | | |
|---|---|---|---|
| 3,791,913 | * 2/1974 | Ver Strate et al. | 161/164 |
| 4,359,492 | * 11/1982 | Schlademan | 427/222 |
| 4,818,785 | * 4/1989 | Otawa et al. | 524/576 |
| 4,970,118 | * 11/1990 | Kresge et al. | 428/407 |
| 5,086,132 | 2/1992 | Joyce | 526/74 |
| 5,438,090 | * 8/1995 | Matsubara et al. | 524/490 |
| 5,438,097 | * 8/1995 | Liles et al. | 525/63 |
| 5,738,941 | 4/1998 | Pero et al. | 428/407 |
| 5,800,758 | * 9/1998 | Topolkaraev et al. | 264/154 |
| 5,837,769 | * 11/1998 | Graafland et al. | 524/505 |
| 5,942,569 | * 8/1999 | Simmons et al. | 524/487 |

OTHER PUBLICATIONS

The Polymeric Materials Encyclopedia ©1996 CRC Press, Inc; Ethylene–Propylene Elastomers; Davis et al.; pp. 1–6.

\* cited by examiner

Primary Examiner—Jan H. Silbaugh
Assistant Examiner—Dae Young Lee
(74) Attorney, Agent, or Firm—P. W. Leuzzi; Robert C. Brown

(57) ABSTRACT

There is provided a method which reduces fines while maintaining the bulk handling advantages of granular or particulate elastomers such as those produced in gas phase processes and which affords continuous bulk handling of synthetic rubbers or elastomers such as those produced in solution and/or suspension processes. The method comprises (1) feeding an crumb form elastomer or a granular elastomer which contains fines along with optionally one or more filler materials to a mixer/extruder where it is masticated and melted into a compound; (2) pumping the compound through an orifice of the mixer/extruder, and (3) cutting and forming the compound into shaped pellets ranging in size from about 0.5 to 30 mm.

8 Claims, 3 Drawing Sheets

Figure 1, cont'd
b) SUSPENSION PROCESS
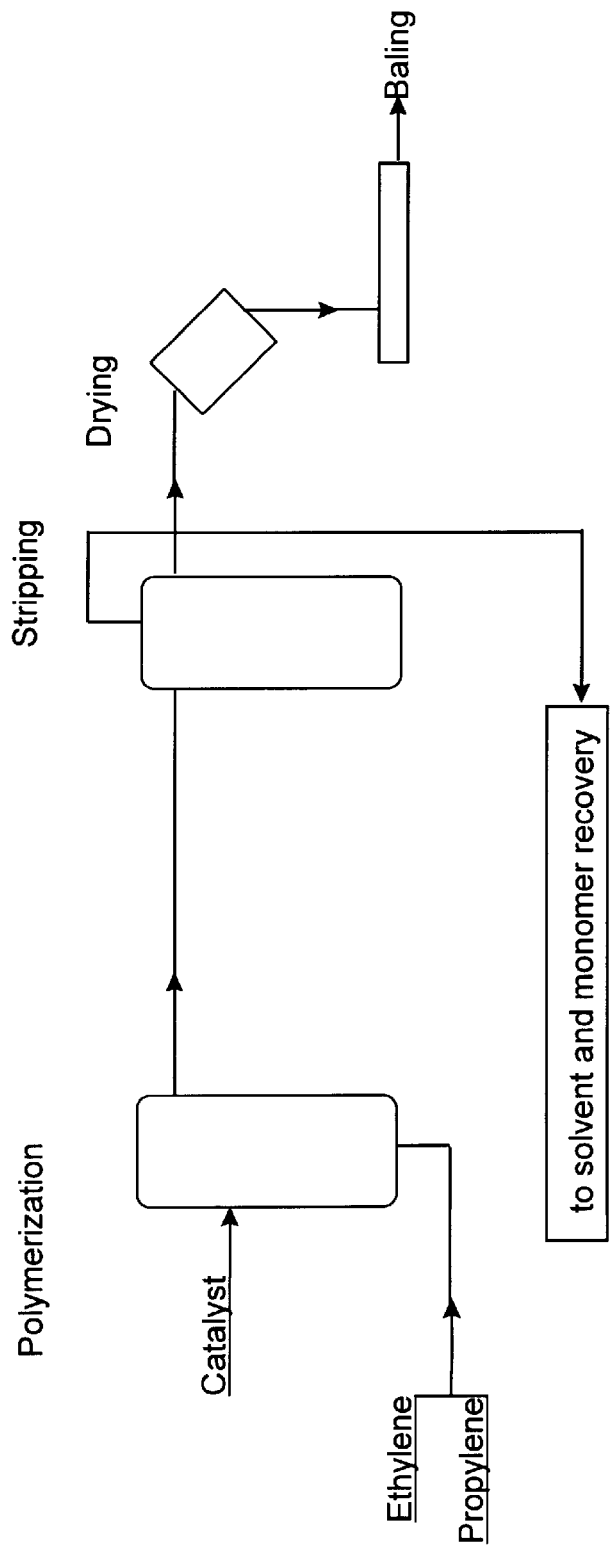

Figure 1, cont'd
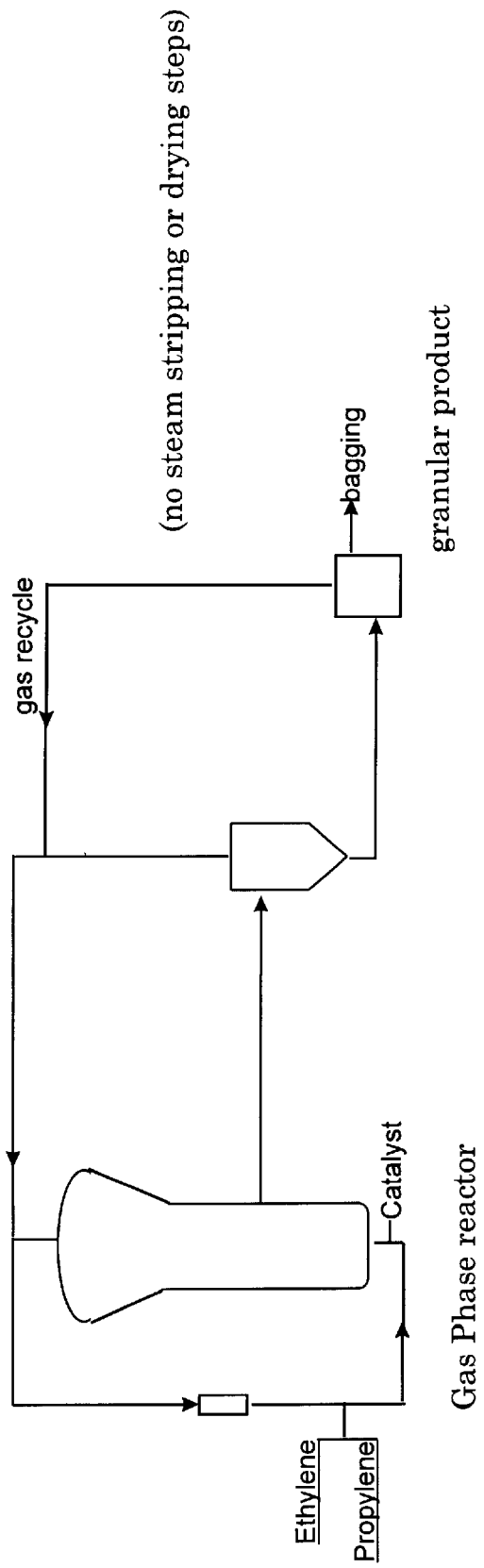

FORM OF SYNTHETIC RUBBER

FIELD OF THE INVENTION

The invention relates to a process for post reactor handling of an elastomer in granular and/or crumb form and the finished form thereof.

BACKGROUND OF THE INVENTION

Elastomers are commercially produced by two processes: solution and suspension. It is well known that the crumb form of these conventional elastomers or synthetic rubbers produced in solution or suspension processes are sticky and uneconomical to handle in a continuous bulk materials handling system. Since these elastomers are tacky, when these elastomeric materials are formed into pellets, the pellets usually agglomerate over time or standing such as in shipping and storage. This agglomeration or sticking together over time of the pellets destroys the free-flowing nature of the rubbery polymer making it difficult to handle and process. In fact, the rubbery elastomeric materials are normally compacted into bales and handled manually piecewise.

In the past attempts to overcome the agglomeration problem associated with pellets of rubber polymers have resulted in the pellets being coated with a fused resinous partitioning agent such as polystryene, polymethylmethacrylate, polyacrylonitrile, polyvinylchloride, or polyethylene. However, these dry powders have a tendency to settle out during coating. And, for some end use applications the presence of these agents cannot be tolerated. More recently, U.S. Pat. No. 5,738,941 coats rubbery polymers or elastomers by coating them with a wax.

Recently, gas phase processes for the production of elastomers have been developed by using inert particulate materials (carbon black, silica, clay, talc, and mixtures of them) in the gas phase process to maintain a fluidized bed and to render the sticky polymer non-sticky. Gas phase elastomers, containing a shell composed mostly of inert particulate material and a core composed mostly of polymer, offer an improvement over conventional rubbers in that they are less sticky, do not require baling, and, thus, can be handled in bulk in their granular, free-flowing form. However, elastomeric particles produced in gas phase processes in the presence of inert particulate materials such as carbon black can have fines and/or dust associated with them. The fines are troublesome in post reaction handling and are a nuisance in finished article fabrication steps.

For elastomers produced in conventional solution and suspension processes there is a need for an alternative to baling or pellets that agglomerate. And for gas phase produced elastomers there is a need to handle the fines associated with them to reduce or eliminate post-handling problems. Therefore, the present invention provides a method for pelletizing elastomers which are typically baled and a method for incorporating fines into gas phase elastomers by pelletizing.

SUMMARY OF THE INVENTION

Figure 1:
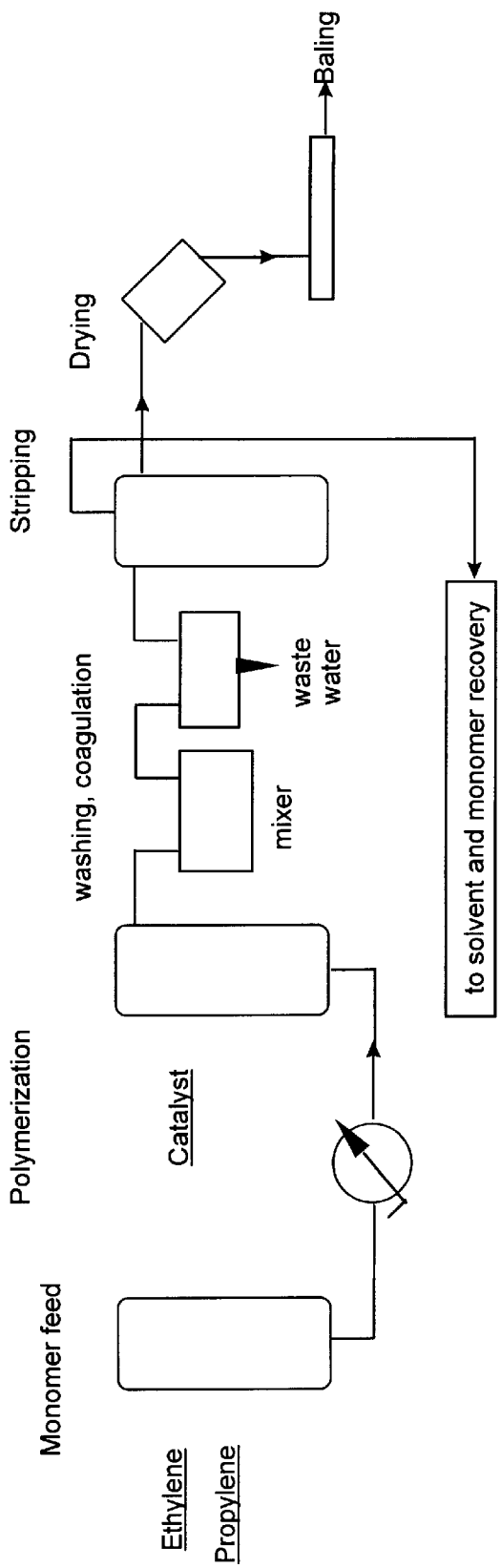
FIG. 1 contains a schematic depiction of processes for producing elastomers: (a) solution process; (b) suspension process: and (c) a gas phase process.

Accordingly, there is provided a method which reduces fines while maintaining the continuous handling advantages of granular or particulate elastomers such as those produced in gas phase processes and which affords continuous bulk handling of synthetic rubbers or elastomers such as those produced in solution and/or suspension processes. The method comprises (1) feeding a crumb form elastomer or a granular elastomer which optionally contains fines along with optionally one or more filler materials to a mixer/extruder where it is masticated and melted into a compound; (2) pumping the compound through an orifice of the mixer/extruder, and (3) cutting and forming the compound into shaped pellets ranging in size from about 0.5 to 30 mm.

DETAILED DESCRIPTION OF THE INVENTION

Elastomers which can benefit from the invention include: polyisoprene (IR); polybutadiene (BR); polymer of butadiene copolymerized with styrene (SBR); polymer of butadiene copolymerized with acrylonitrile (Nitrile); polymer of isobutylene compolymerized with isoprene (Butyl); polymer of ethylene copolymerized with propylene (EPM); polymer of ethylene copolymerized with propylene and a diene (EPDM); copolymers of ethylene and a $C_4$ to $C_{12}$ alpha olefin such as butene, hexene or octene; terpolymers of ethylene, a $C_4$ to $C_{12}$ alpha olefin, and a diene; polychloroprene (Neoprene); polydimethylsiloxane (Silicone); copolymers of ethylene and vinyltrimethoxysilane; copolymers of ethylene and one or more acrylonitrile, maleic acid esters, vinyl acetate, acrylic, methacrylic acid esters and the like; copolymers of butadiene and isoprene; terpolymers of styrene, butadiene, and isoprene; chlorinated copolymer of isobutylene and isoprene (Chlorobutyl); brominated copolymer of isobutylene and isoprene (Bromobutyl); and brominated copolymer of isobutylene and paramethylstyrene. Of these, polyisoprene, polybutadiene, poly(styrene-butadiene), ethylene-$C_3$-$C_{12}$ alpha-olefin optionally containing a diene are preferred. Polymer of ethylene copolymerized with propylene and polymer of ethylene copolymerized with propylene, and a diene are most preferred. Preferably, the propylene content or non-ethylene alpha olefin content of these polymers is greater than 15 wt %, most preferably greater than 20 wt %. The diene employed can be selected from those listed in U.S. Pat. No. 5,317,036. Preferred dienes is included 2-methyl-pentadiene,1,4-hexadiene, 1,5-hexadiene, 5-vinyl-2-norbornene, 1,7-octadiene, 7-methyl-1,6-octadiene, dicyclopentadiene, ethylidene norbornene (ENB) and mixtures thereof. Most preferably, the diene is ethylidene norbornene, 7-methyl-1,6-octadiene, 1,4-hexadiene, dicyclopentadiene, and a mixtures thereof.

In a preferred embodiment, many of the above-enumerated polymers can be produced in a gas phase fluidized bed polymer production process. Gas phase polymerization is very well known in the art as shown, for example, by the disclosure appearing in U.S. Pat. Nos. 4,379,758; 4,383,095; 4,876,320; 4,994,534; 5,304,588; 5,317,036; and 5,453,471, as well as WO 96/04322 and 04323. The production of polymers in gas phase stirred reactors is also well known in the art as exemplified by the process and equipment descriptions appearing in U.S. Pat. No. 3,256,263. Gas phase polymerizations can be conducted in condensed mode, induced condensed mode, and/or liquid monomer mode, all of which are known in the art. Preferably, in these processes the polymers are produced in the presence of an inert particulate material (carbon black, silica, clay, talc, etc.), as taught for example in U.S. Pat. No. 4,994,534. Preferably the inert particulate material is carbon black, silica, or a mixture thereof. Most preferably, carbon black is employed. Fines or dust associated with the gas phase preparation of these polymers can range from 0.5 to 30 wt % as measured by sieve testing. As disclosed in U.S. Pat. No. 5,304,588 these elastomers have an outer shell comprised of mostly inert particulate material and an inner core comprised mostly of polymer. These gas phase produced polymers having fines associated with them can be pelletized according to the method of the invention prior to purging or after the purging of gaseous unreacted monomers in production.

Fillers

The elastomer in granular or crumb form is continually co-fed to the mixer/extruder with one or more filler materials. Co-feeding of the elastomer and the filler can be effected simultaneously at one or more locations in or along the mixer/extruder. Filler can be added in an amount ranging from about 5 to 50 wt %, preferably from about 20 to 40 wt %. Fillers for use in the invention include carbon black; silica; fumed silica; clay; talc; silicates of aluminum, magnesium, calcium, sodium, and potassium; calcium carbonate; magnesium carbonate; oxides of silicon, calcium, zinc, iron, titanium and aluminum; sulfates of calcium, barium, and lead; alumina trihydrate, magnesium hydroxide; phenol-formaldehyde; polystyrene; poly(alphamethyl) styrene resins; natural fibers; synthetic fibers; and the like. Carbon blacks, for example, furnace black, channel black, thermal black, acetylene black, and lamp black are preferred particulate materials.

The technique of the invention can be used to make a free-flowing pellet of the elastomer. In the first step of the method of the invention elastomer with or without filler is fed into a mixer/extruder. It is, of course, necessary to have previously processed the rubber into a physical form that can be fed into the mixer/extruder. This physical form is the "as is" condition of the elastomer exiting a gas phase reaction and processing system. That is, the granular particles having inert particular material contained thereon and/or the fines associated with such elastomeric particles. In which case, depending on the desired level of filler in the final pellet, a filler material, which is the same or different from the inert particulate material employed during gas polymerization, can be mixed with the elastomer. For elastomer produced via solution or suspension processes, typically in the absence of inert particulate material or filler, the crumb form is mixed in the mixer/extruder with a filler material.

The mixer/extruder is the apparatus in which the elastomer containing fines and/or fillers is masticated and dispersed to form a compound. Any equipment capable of masticating such composition can be employed, continuous mixers such as a Farrel FCM and the like, twin screw compounders such as a Werner and Pfleiderer ZSK series and the like, single screw extruders with or without pins in the barrel such as provided by Davis Standard, or axially reciprocating rotating screws such as the Buss-Condux type are preferred. The mixer/extruder is operated at a speed in a manner whereby the rubber exiting the extruder is at a temperature of less than about 150 degrees C. The temperature profile of the mixer/extruder should use temperature ranges which will allow the extrudate to be maintained at the desired temperatures. A typical temperature profile might include temperatures with the range of 100 degrees C to 150 degrees C. The elastomer exiting the mixer extruder will typically be at a temperature of less than about 125 degrees C.

The masticated compound is pumped through an orifice. Generally, the orifice is a die used to form the compound into an intermediate shape for later use or into the finished article form. Strands formed from the compound are then cut into particulate pellets. The cutting into pellets can be performed by conventional means and can include, for example, underwater, water ring, and dry pelletizing systems.

The elastomer will be extruded into pellets which have a diameter which is within the range of about 0.5 mm (millimeter) to about 30 mm. The elastomeric material will typically or preferably be extruded into pellets having a diameter which is within the range of about 1 mm to about 3 mm. The pellets will most preferably have a diameter of 1 mm to 2 mm. The pellets will more typically be cut to a length of about 0.5 mm to 12 mm. The pellets length-to-diameter ratio is preferably 0.5:1 to 1:1.

One skilled in the art would think that it is necessary to "coat" the elastomeric material with an inert particulate material or filler to render it non-sticky. Accordingly, it was surprising that the pellets produced having the filler and inert particulate material incorporated into their interior and not adhering to the surface of the elastomer, are non-sticky, non-agglomerating and remain so for long periods of time.

Commercially solution elastomers are dissolved in a solvent (e.g., hexane). Solution polymerization is normally carried out at 20 to 50 degrees C and up to 20 bar. The heat or reaction is removed by evaporative cooling or chilling reactor feeds. Following a residence time of 30 to 90 minutes, the polymer solution is treated with water to short stop the polymerization reaction, and catalyst is washed from the polymer using a basic or acidic water solution. In this stage, water and polymer solution form two phases. The water, containing catalyst residues, is removed from the bottom of the washing vessel. Residual monomers and hexane are vaporized and recondensed in a recovery system. After purification, the recovered solvent and monomers are recycled back to the reactor. The coagulated polymer forms a crumb, which is dewatered on a screen then further dried by squeezing in an expeller and finally dried in a hot extruder or fluid bed dryer. After cooling, the crumb is baled in 75- or 55-pound bales. However, in the present invention the coagulated polymer or crumb which has been dewatered and/or dried is mixed with filler and fed to an extruder herein for pelleting. That is, no bales are formed and the pelleted product handles well without agglomerating.

In suspension processes, the polymer is precipitated in an excess of comonomer (e.g. propylene for EPRs). At high comonomer concentrations, the polymer becomes insoluble. The operation fo a suspension process enables production at high solids levels (20–30 wt %), which enables polymer production with a lower amount of reactor volume and total hydrocarbon material in the process compared to a solution process. High solids levels are achieved due to the low viscosity of the reaction medium (mainly comonomer). It is followed by stripping and drying steps analogous to the solution process. Accordingly the coagulated polymer such as that obtained in solution, bulk, or suspension processes can be pelleted according to the process of the present invention by extruding/mixing it with filler or inert particulate material prior to or after drying, without baling to produce a non-agglomerating pellet form. Granular polymer (with or without fines attached thereto) produced in a gas phase reactor is pelleted by the process of the invention in the "as is" form from the reactor, that is before subsequent downstream processing such as purging. Alternatively, the gas phase polymer can be subjected to the pelletizing process of the invention after purging.

All references cited herein are incorporated by reference.

Whereas the scope of the invention is set forth in the appended claims, the following specific examples illustrate certain aspects of the invention. The examples are set forth for illustration only and are not to be construed as limitations on the invention, except as set forth in the claims. All parts and percentages are by weight unless otherwise specified.

EXAMPLES

The preferred embodiment of the invention can be best illustrated in the following examples shown in Table 1. The tests were done with EPDM produced by a gas phase process. The sub-150 microns fines concentrations in the EPDM materials were 1 to 6 percent by weight. Pellets in Examples 4 to 7 were produced by feeding a mixture of EPDM and carbon black (as filler) into a Werner & Pfleiderer model ZSK-30 twin screw extruder, masticating the compound and pumping through a die plate with four orifices of 3 mm diameter each. The strands were cooled in a water bath, air dried and diced by rotating knives. Pellets in Example 8 were produced by feeding EPDM into a single screw extruder with 4.5 inch diameter screw and pumping through a die plate with twenty four orifices of 1.1 mm diameter each. The pellets were cut underwater using a Gala pelletizer and then air dried The solids flow performance of pellets in Examples 4 to 8 were compared to the original granular elastomer in Examples 1 to 3.

The pellets had no carbon black fines. In addition, the pellets had rough surfaces and were non-sticky. The pellets were stored at room temperature for several days. Both elastomers were flowable at room temperature. The solids flow performance was determined from the arching index measured by the Johnanson Hangups Indicizer®™ instrument manufactured by JR Johnanson, Inc. In this test, a sample of test solids is conditioned in a test cell under a consolidation load and the temperature conditions to simulate storage conditions in a bin of desired diameter. After a period of storage, the cell bottom is opened and the compacted solids are forced to flow out by a piston. The force that caused the solids to flow is measured. The value of the arching index is calculated from the force. The arching index is a measure of ease of flow. Example 1 to 8 show whether the solids will flow in a 15 foot diameter bin. The samples were kept under the load of a bin with the indicated diameter, temperature and storage time indicated in the examples. The elastomers in Example 1 would not flow with the arching index greater than abut 50 and would flow with the arching index less than about 12. From the experiments, it was found that the granular elastomer in Example 1 would not flow; and in Example 2 and 3, it would flow. The results in Examples 6 and 7 showed that the pellets with above 30 wt. % carbon black have the improved flow characteristics after 2 minutes to 72 hours of storage indicated by the lower values of the arching index. Example 8 shows improved flowability with a smaller size pellets of 1 mm diameter based on the lower arching index after 72 hours of storage at 45 C compared to the pellets with 3 mm diameter in Examples 5 and 6.

TABLE 1

| Examples | 1 | 2 | 3 | 4 |
|---|---|---|---|---|
| EPDM 1 (95 Mooney ML1 + 4 @ 125° C., C3 = 35% ENB = 2%, with Carbon Black 22 phr), wt % | 100 | 100 | | 100 |
| EPDM 2 (87 Mooney ML1 + 54 @ 125° C., C3 = 30% ENB = 4.5%, Carbon Black 19 phr), wt % | | | 100 | |
| Additional N-650 Carbon Black, wt. % | 0 | 0 | 0 | 0 |
| Final Solids Form | granular from reactor | granular from reactor | granular from reactor | pellets 3 mm diameter |
| Fines, wt % | 1–6 | 1–6 | 1–6 | 0 |
| Extrusion Data: | | | | |
| Feed Rate, pound/hour | | | | 100 |
| Screw Speed, rpm | | | | |
| Melt Temp ° C. | | | | |
| Power, kW | | | | |
| Arching Index: | | | | |
| 15 FT Bin diameter, storage 2 mm @ Room Temperature | | | | |
| 15 FT Bin diameter, storage 2 min @ 36° C. | | 1.8 | | |
| 12 FT Bin diameter, storage 2 min @ 40° C. | | | | 1.8 |
| 15 FT Bin diameter, storage 2 min @ 45° C. | 4.9 | | 1.9 | |
| 12 FT Bin diameter, storage 2 min @ 55° C. | | | | 8 |
| 15 FT Bin diameter, storage 72 hours @ Room Temperature | | | | |
| 15 FT Bin diameter, storage 72 hours @ 36° C. | | 11.6 | | |
| 15 FT Bin diameter, storage 72 hours @ 45° C. | 50.5 | | 5.5 | |

| Examples | 5 | 6 | 7 | 8 |
|---|---|---|---|---|
| EPDM 1 (95 Mooney ML1 + 4 @ 125° C., C3 = 35% ENB = 2%, with Carbon Black 22 phr), wt % | 90 | 70 | 50 | 100 |
| EPDM 2 (87 Mooney ML1 + 54 @ 125° C., C3 = 30% ENB = 4.5%, Carbon Black 19 phr), wt % | | | 50 | |
| Additional N-650 Carbon Black, wt. % | 10 | 30 | 50 | 0 |
| Final Solids Form | pellets 3 mm diameter | pellets 3 mm diameter | pellets 3 mm diameter | pellets 1 to 2 mm diameter 0.5 to 3 mm length |
| Fines, wt % | 0 | 0 | 0 | 0 |
| Extrusion Data: Feed Rate, pound/hour | 7.2 | 7.8 | | 50 to 120 |
| Screw Speed, rpm | 100 | 100 | 100 | 12 |
| Melt Temp ° C. | 131 | 124 | 220 | 160 |

TABLE 1-continued

| | | | | |
|---|---|---|---|---|
| Power, kW | 3.3 | 2.5 | | |
| Arching Index: 15 FT Bin diameter, storage 2 mm @ Room Temperature | | | | <0.2 |
| 15 FT Bin diameter, storage 2 min @ 36° C. | | | | <0.2 |
| 12 FT Bin diameter, storage 2 min @ 40° C. | 4.6 | 0.7 | <0.2 | |
| 15 FT Bin diameter, storage 2 min @ 45° C. | 11.3 | 1.5 | <0.2 | 1.3 |
| 12 FT Bin diameter, storage 2 min @ 55° C. | 30 | 10.8 | 0.3 | |
| 15 FT Bin diameter, storage 72 hours @ Room Temperature | | | | 11.2 |
| 15 FT Bin diameter, storage 72 hours @ 36° C. | | | | 34.1 |
| 15 FT Bin diameter, storage 72 hours @ 45° C. | 182 | 120 | 60.1 | 63.9 |

EXAMPLE 9

A sample from a bale of EPDM produced by means of a solution process was chopped to simulate crumb form and shaped into pellets using carbon black as the filler material as set forth in Example 4 with similar results.

What is claimed is:

1. A method for preparing discrete granular flowable elastomeric particles from sticky elastomeric polymer which is prone to agglomerate, which comprises:

(1) mixing said polymer with from about five percent to about 50 weight percent, based on the weight of said polymer, of a finely divided inert particulate material selected from the group consisting of carbon black; silica; fumed silica; clay; talc; silicates of aluminum, magnesium, calcium, sodium, and potassium; calcium carbonate; magnesium carbonate; oxides of silicon, calcium, zinc, iron, titanium, and aluminum; sulfates of calcium, barium, and lead; alumina trihydrate; magnesium hydroxide; phenolformaldehyde; polystyrene; poly(alphamethyl)styrene resins; natural fibers; synthetic fibers; and mixtures thereof;

(2) extruding said polymer mixed with inert particulate material into strands; and (3) cutting and forming said strands into shaped, non-sticky, non-agglomerating pellets ranging in diameter from about 0.5 mm to about 32 mm.

2. The method of claim 1 wherein the temperature of said strands leaving the extruder is maintained below about 150 degrees C.

3. The method of claim 1 wherein the pellets produced have a diameter within the range of about 1 mm to about 15 mm.

4. The method of claim 3 wherein the pellets produced have a length of about 0.5 mm to 12 mm.

5. The method of claim 1 wherein the said sticky elastomer is selected from the group consisting of polyisoprene; polybutadiene; polymer of butadiene copolymerized with styrene; polymer of butadiene copolymerized with acrylonitrile; polymer of isobutylene compolymerized with isoprene; polymer of ethylene copolymerized with propylene; polymer of ethylene copolymerized with propylene and a diene; copolymers of ethylene and a $C_4$ to $C_{12}$ alpha olefin; terpolymers of ethylene, a $C_4$ to $C_{12}$ alpha olefin, and a diene; polychloroprene; polydimethylsiloxane; copolymers of ethylene and vinyltrimethoxysilane; copolymers of ethylene and one or more acrylonitrile, maleic acid esters, vinyl acetate, acrylic, methacrylic acid esters and mixtures thereof; copolymers of butadiene and isoprene; terpolymers of styrene, butadiene, and isoprene; chlorinated copolymer of isobutylene and isoprene; brominated copolymer of isobutylene and isoprene; and brominated copolymer of isobutylene and paramethylstyrene; and mixtures thereof.

6. The method of claim 5 wherein the elastomer is selected from the group consisting of polyisoprene, polybutadiene, poly(styrene-butadiene), ethylene-$C_3$–$C_{12}$ alpha-olefin optionally containing a diene.

7. The method of claim 6 wherein the elastomer is a polymer of ethylene copolymerized with propylene or a polymer of ethylene copolymerized with propylene, and a diene.

8. The method of claim 1 wherein the elastomer is produced in a gas phase polymerization.

* * * * *